United States Patent
Suzuki et al.

(10) Patent No.: US 6,969,127 B2
(45) Date of Patent: Nov. 29, 2005

(54) ELECTRIC PARKING BRAKE SYSTEM

(75) Inventors: Hidetoshi Suzuki, Hamamatsu (JP); Eiji Ina, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 10/822,881

(22) Filed: Apr. 8, 2004

(65) Prior Publication Data

US 2004/0201270 A1   Oct. 14, 2004

(30) Foreign Application Priority Data

Apr. 11, 2003   (JP) .............................. 2003-108086
Apr. 15, 2003   (JP) .............................. 2003-110424

(51) Int. Cl.$^7$ ............................................. B60T 13/66
(52) U.S. Cl. ...................... 303/20; 303/199; 303/122
(58) Field of Search ........................... 303/3, 122, 199, 303/146, 191, 122.04, 20; 701/70, 71

(56) References Cited

U.S. PATENT DOCUMENTS 6,249,737 B1 *   6/2001   Zipp ........................... 701/70
6,447,074 B2 *   9/2002   Engelhard ...................... 303/3
2002/0027386 A1 *   3/2002   Yanaka et al. .................. 303/3

FOREIGN PATENT DOCUMENTS

JP   2001-523616   11/2001
JP   2002-529314   9/2002

* cited by examiner

Primary Examiner—Melanie Torres
(74) Attorney, Agent, or Firm—Sheridan Ross P.C.

(57) ABSTRACT

A sensor included in each brake system section detects the operation state of an electric parking brake in another brake system section. Based on the detected operation state, the sensor assumes the drive command that is to be output from a controller of the other brake system section to a controller of its own brake system section. The controller of one brake system receives an input of a drive command that is output from the controller of the other brake system. The controller of one brake system compares the assumed drive command (internal value) with the input drive command (input value). When the internal value and the input value do not match, the controller determines that an abnormality has occurred in the other brake system section.

17 Claims, 8 Drawing Sheets

Fig.5

| Input Signal | Elapsed Time (Distance) | Current Sensor | 1st Rotation Speed Sensor | 2nd Rotation Speed Sensor | Abnormality Location (State) |
|---|---|---|---|---|---|
| Brake or Release | — | I<I1 | No Change | No Change | Driver or Motor (Breakage) |
| | T<T0 | I>I2 | — | — | Driver or Motor (Short Circuit) |
| | | I<I1 | Change | Change | Current Sensor |
| | | I>I1 | No Change | Change | 1st Rotation Speed Sensor |
| | | I>I1 | Change | No Change | 2nd Rotation Speed Sensor |
| | | I>I3 | No Change | No Change | Actuator (Lock) |
| Brake | T>T1 | I<I3 | Change | Change | Actuator (Motor Idling) |
| Release | T>T2 | — | Change | Change | Actuator (Defective Reverse Rotation) |
| | X<X0 | — | No Change | No Change | Actuator (Excessive Reverse Rotation) |

ELECTRIC PARKING BRAKE SYSTEM

BACKGROUND OF THE INVENTION

The present invention relates to an electric parking brake system.

An electric parking brake system including an electric parking brake and a controller is conventionally known. The electric parking brake is driven by a motor to apply braking force to wheels.

As one example, Japanese National Phase Laid-Open Patent Publication No. 2001-523616 discloses an electric parking brake system including a brake actuator, an electronic control unit that includes a plurality of controllers for separately processing input signals to convert the signals into the corresponding output signals, and a plurality of electric parking brakes that are actuated in accordance with the output signals. The electric parking brake system further comprises a voter that is connected downstream of the controllers and to give decisions based on the majority vote.

According to the above structure, even when an electric failure occurs in a circuit including one of the controllers, at least one electric parking brake can be actuated by a circuit including another controller. This ensures execution of an emergency operation mode. Further, even when, for example, the output signals from the controllers differ from one another, the voter determines a final output signal with the majority vote. This enables each electric parking brake to be provided with a stable output signal.

As another example, Japanese National Phase Laid-Open Patent Publication No. 2002-529314 discloses an electric parking brake system including an input unit for receiving a request from a driver, and an electronic control unit for detecting the driver's request based on a signal output from the input unit and controlling a parking brake. The input unit outputs a plurality of redundant signals to the electronic control unit. The electric parking brake system further includes an evaluation unit for detecting an electric failure occurring in the input unit. A resistor is connected to each of signal lines, supply lines, and ground lines provided in the input unit. The evaluation unit detects an electric failure in the input unit by measuring the potential at each resistor.

According to the structure disclosed in Japanese National Stage Laid-Open Patent Publication No. 2002-529314, the evaluation unit detects such failures occurring in the input unit as a break in a wiring, a switch contact failure caused by corrosion, and a short circuit in a supply line, based on the measured potential at each resistor and the redundant signals. This structure enables failures to be readily coped with.

According to the structure disclosed in Japanese Laid-Open National Phase Patent Publication No. 2001-523616, when an electric failure occurs in a circuit including one of the controllers, the electric parking brake connected to the failed circuit cannot be actuated. In an emergency operation mode, specifically, in a parking-brake applying operation where one of the electric parking brakes is not functioning, reliability and stability of the braking performance is degraded. Further, at least three or more controllers in an odd number are required to enable the voter to function. This complicates the structure and increases the cost of the electric parking brake system.

In the electric parking brake system disclosed in Japanese National Phase Laid-Open Patent Publication No. 2002-529314, the electric parking brake is arranged at such a location to which vibrations are easily transmitted when the vehicle is traveling. Further, the electric parking brake arranged at the location may become wet. Accordingly, a failure is more likely to occur in the electronic control unit and the electric parking brake than in the input unit.

Despite this, the electronic control unit, which can detect an electric failure in the input unit, cannot detect a failure in its control target electric parking brake. The electric parking brake system fails to detect a failure occurring both in the electric parking brake and on a path to supply power to the electric parking brake at an early stage. Thus, such a failure cannot be coped with immediately.

SUMMARY OF THE INVENTION

It is a first object of the present invention to provide an electric parking brake system featuring highly stable braking performance. It is a second object of the present invention to provide an electric parking brake system that enables early detection of a failure.

To achieve the above object, the present invention provides a parking brake for applying braking force to wheels of a vehicle. The parking brake system includes at least two independent brake system sections, each associated with one of the wheels. Each of the brake system sections includes a motor, a parking brake, driven by the motor, for applying braking force to the associated wheel, a detector for detecting an operation state of the parking brake, and a controller for determining a drive command that is to be output to the motor in accordance with the operation state detected by the detector. The controller detects the operation state of the parking brake in the other brake system section through the detector of the other brake system section, assumes the drive command that is to be output from the controller of the other brake system section, detects the drive command actually output from the controller of the other brake system section, and compares the actually detected drive command with the assumed drive command to determine abnormality of the other brake system section.

A further aspect of the present invention is a parking brake for applying braking force to a wheel of a vehicle. The brake system includes a motor, a parking brake, driven by the motor, for applying braking force to the wheel, a rotation sensor for detecting a rotation condition of the motor, a current sensor for detecting the amount of current supplied to the motor, an electric path through which current supplied to the motor flows, a host control unit for outputting a brake command signal, and a controller for controlling activation of the parking brake based on the brake command signal. The controller detects abnormality of at least one of the parking brake, the electric path, the rotation sensor, and the current sensor based on at least one of the brake command signal, the detected rotation state, the detected current amount, and the elapsed time from when the motor is activated.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a schematic diagram showing the structure of a control table for use in an electric parking brake system according to a second embodiment of the present invention;

DETAILED DESCRIPTION OF THE PREFERRED EMBODIMENTS

The following describes a first embodiment of the present invention, with reference to FIGS. 1 to 4.

Figure 1:
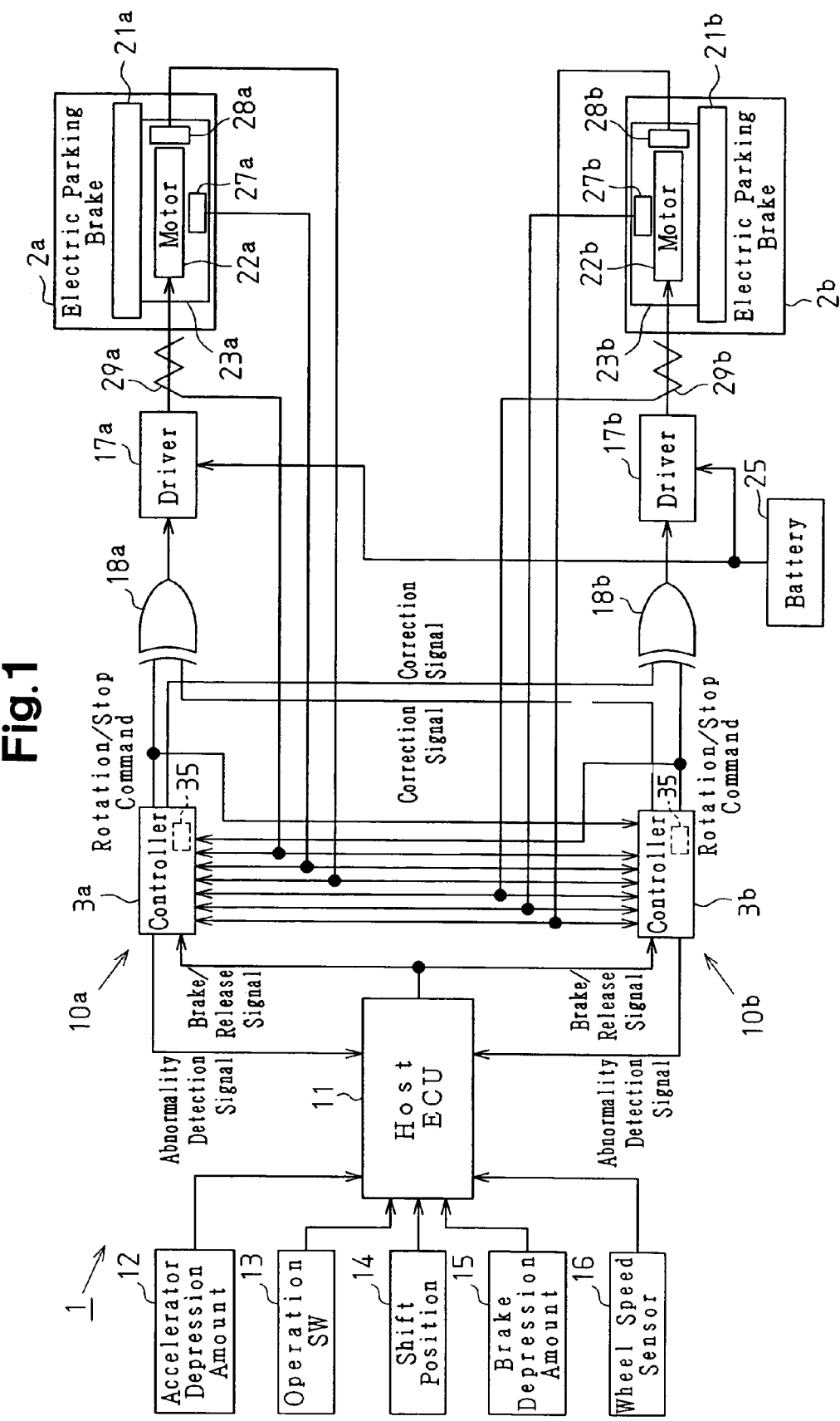
FIG. 1 is a schematic diagram showing the structure of an electric parking brake system according to a first embodiment of the present invention.

As shown in FIG. 1, an electric parking brake system 1 includes a first brake system section 10a, a second brake system section 10b, and a host ECU (electronic control unit) 11. The host ECU 11 outputs a brake command signal to each of the first brake system section 10a and the second brake system section 10b. The first brake system section 10a includes an electric parking brake 2a and a controller 3a. The controller 3a outputs a drive command for controlling the operation of the electric parking brake 2a. The second brake system section 10b includes an electric parking brake 2b and a controller 3b. The controller 3b outputs a drive command for controlling the operation of the electric parking brake 2b. The host ECU 11 controls parking braking of the vehicle by outputting a brake command signal (a brake apply signal or a brake release signal) to each of the controllers 3a and 3b included in the first and second brake system sections 10a and 10b. The host ECU 11 and each of the controllers 3a and 3b are connected to one another and communicate with one another through an electric signal. The host ECU 11 and each of the controllers 3a and 3b may also communicate with one another through a network.

In the present embodiment, each of the controllers 3a and 3b functions to detect its system's braking state, determine its system's output, detect other system's braking state, detect other system's output, assume a correct command, detect an abnormality, output a correction signal, and output an abnormality detection signal. The host ECU 11 functions to determine a failure, detect a vehicle state, and determine a brake command signal.

The electric parking brake system 1 includes, as vehicle state detection units for detecting vehicle state information, an accelerator depression amount sensor 12, an operation switch 13, a shift location sensor 14, a brake depression amount sensor 15, and a wheel speed sensor 16. These units are connected to the host ECU 11. The wheel speed sensor 16 uses a Hall IC or the like. The host ECU 11 determines which one of a brake apply signal and a brake release signal to output as a brake command signal to each of the controllers 3a and 3b.

The host ECU 11 detects vehicle state information by a plurality of methods involving one or a predetermined combination of the vehicle state detection units. This enables vehicle state information, which is used to determine a brake command signal, to have redundancy, and leads to highly reliable braking performance.

The host ECU 11 uses the detected vehicle state information, specifically, one or a predetermined combination of the rotation speed of the wheel, the speed of the vehicle, the shift location, the manipulation amount of the accelerator pedal, the manipulation amount of the brake pedal, and the on/off state of the operation switch, to determine which one of a brake apply signal and a brake release signal to output to each of the controllers 3a and 3b.

For example, the host ECU 11 outputs a brake apply signal to each of the controllers 3a and 3b when the operation switch is on and the accelerator pedal is off. The host ECU 11 outputs a brake release signal to each of the controllers 3a and 3b when the operation switch is off and the manipulation amount of the brake pedal is large enough to produce a sufficient braking force in the vehicle.

The following describes the brake system in detail. Because the first brake system section 10a and the second brake system section 10b have the same structure, the following description is focused on the structure of the brake system section 10a.

The first brake system section 10a includes a driver 17a and a correction unit 18a. The driver 17a supplies an electric parking brake 2a with driving power. The correction unit 18a optimizes a drive command that is output from the controller 3a.

Figure 2:
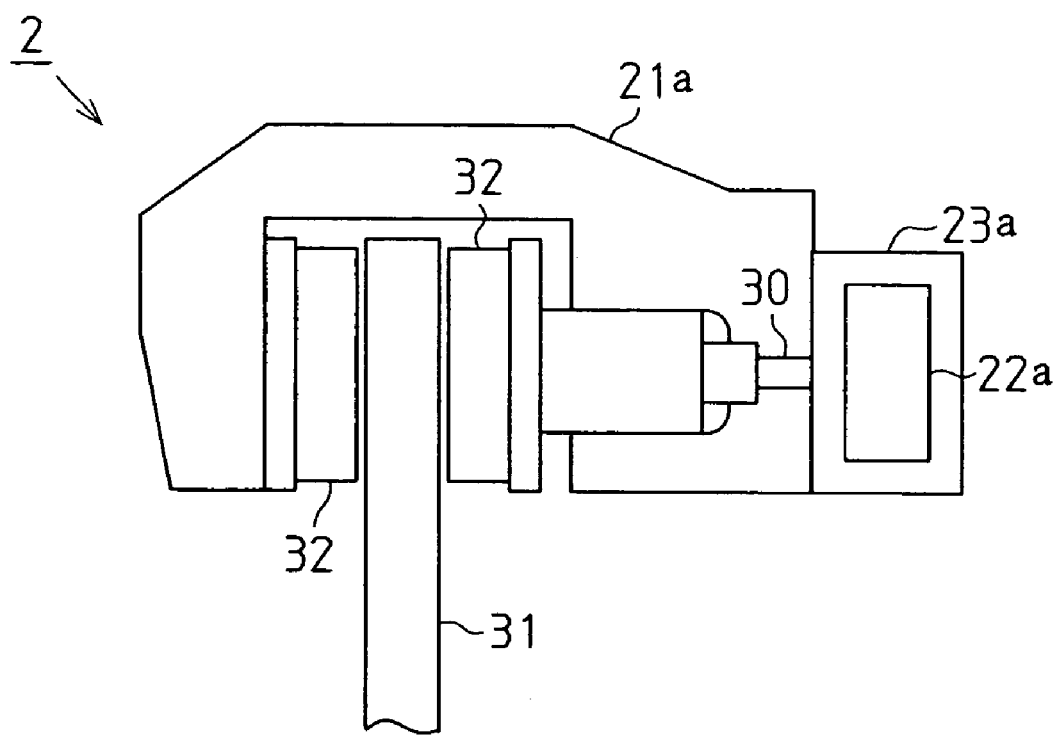
FIG. 2 is a schematic diagram showing the structure of an electric parking brake included in the electric parking brake system of FIG. 1.

As shown in FIG. 2, the electric parking brake 2a is mounted on a wheel (not shown), and includes a brake unit 21a and an actuator 23a. The brake unit 21a applies braking force to the wheel. The actuator 23a drives the brake unit 21a by using a motor 22a that serves as a driving source. The actuator 23a converts forward/reversed rotation of the motor 22a into reciprocating motion of an output shaft 30 in its axial direction.

The brake unit 21a includes a rotor 31, which is rotated integrally with the wheel, and a pair of friction members 32, which approaches or is spaced from the rotor 31 according to the reciprocating motion of the output shaft 30.

The brake unit 21a is driven by the actuator 23a, and each friction member 32 approaches and presses the rotor 31 to apply a braking force to the wheel. The braking force is released when each friction member 32 is spaced from the rotor 31.

As shown in FIG. 1, the motor 22a is connected to a battery 25 via the driver 17a. The driver 17a is connected to the controller 3a via the correction unit 18a. The actuator 23a includes first and second rotation speed sensors 27a and 28a connected to the controller 3a.

Each of the first and second rotation speed sensors 27a and 28a is composed of a ring magnet and a Hall IC. The ring magnet is attached in such a manner that its magnetic flux passing through the Hall IC cyclically changes according to the rotation of the motor 22a. Each of the first and second rotation speed sensors 27a and 28a outputs a pulse signal whose level changes according to the rotation of the motor 22a. The controller 3a counts the number of pulses of a pulse signal input from each of the first and second rotation speed sensors 27a and 28a. The controller 3a then multiplies the rotation number of the motor detected based on the counted number of pulses and the distance by which each friction member 32 is moved per rotation during normal operations. In this way, the controller 3a assumes the distance by which each friction member 32 is to be moved.

The first brake system section 10a further includes a current sensor 29a. The current sensor 29a is arranged between the driver 17a and the electric parking brake 2a to detect the amount of driving current supplied to the motor 22a. The current sensor 29a is connected to the controller 3a.

The controller 3a detects a failure in the first brake system section 10a and in the sensors based on at least one of the brake command signal input from the host ECU 11, the rotation state of the motor 22a, the amount of driving current supplied to the motor 22a, and the elapsed time during which the motor 22a is being energized (hereafter referred to as the "elapsed time"). To be more specific, the controller 3a detects a failure occurring in at least one of the electric parking brake 2a, the power supply path to the motor 22a, the first rotation speed sensor 27a, the second rotation speed sensor 28a, and the current sensor 29a.

In the present embodiment, the power supply path is specifically a path (power line) for supplying driving power from the battery 25 to the motor 22a and is composed of the wiring connecting the battery 25 and the driver 17a, the driver 17a, and the wiring connecting the driver 17a and the motor 22a.

The controller 3a determines the rotation direction of the motor 22a based on a brake apply signal or a brake release signal that is input from the host ECU 11, and outputs a drive command (a command to rotate or stop the motor 22a) to the driver 17a. The driver 17a supplies the motor 22a with driving power based on the drive command that is input from the controller 3a.

The controller 3a controls the operation of the electric parking brake 2a included in its own brake section. In addition to this, the controller 3a monitors the state of another brake section, that is, the second brake system section 10b. Likewise, the controller 3b not only controls the operation of the electric parking brake 2b included in its own brake system, but also monitors the state of the other brake system, that is, the first brake system section 10a. In other words, the controllers 3a and 3b mutually monitor the state of the other brake system.

The controller 3a of the first brake system section 10a and the controller 3b of the second brake system section 10b are connected to each other. Each of the controllers 3a and 3b receives a drive command that is output from the controller 3a or 3b of the other brake system.

Each of the controllers 3a and 3b determines the operation state of the electric parking brake 2a or 2b of the other brake system, based on signals input from the sensors 27a or 27b, 28a or 28b, and 29a or 29b of its own brake system. Based on the operation state of the electric parking brake 2a or 2b of the other brake system, each of the controllers 3a and 3b assumes the drive command that should be output from the controller 3a or 3b of the other brake system.

Each of the controllers 3a and 3b compares the assumed drive command (internal value) with an input drive command (input value) to determine whether the internal value and the input value match, that is, whether the drive command output from the controller 3a or 3b of the other brake system is correct. When the internal value and the input value do not match, each of the controllers 3a and 3b determines that an abnormality has occurred in the other brake system.

When detecting an abnormality in the other brake system, each of the controller 3a and 3b outputs an abnormality detection signal to the host ECU 11. The host ECU 11 communicates with the controller 3a or 3b included in the abnormality-detected brake system, based on the abnormality detection signal. When no response is made to the communication, the host ECU 11 determines that a failure has occurred in the controller 3a or 3b included in the abnormality-detected brake system.

The controllers 3a and 3b can detect a failure in the electric parking brakes 2a and 2b, and the sensors 27a, 27b, 28a, 28b, 29a, and 29b. An abnormality detection signal to be output to the host ECU 11 includes a signal indicating a detected failure. When determining that a failure has occurred in either the brake system section 10a or 10b, the host ECU 11 gives a vehicle passenger a warning message indicative of the failure occurrence and the location where the failure has occurred.

The controller 3a of the first brake system section 10a is connected to the correction unit 18b of the second brake system section 10b. Likewise, the controller 3b of the second brake system section 10b is connected to the correction unit 18a of the first brake system section 10a. Each of the controllers 3a and 3b outputs a correction signal to the correction unit 18a or 18b of the other brake system when an incorrect drive command is output from the controller 3a or 3b of the other brake system. In this way, each of the controllers 3a and 3b optimizes a drive command of the other brake system.

The correction unit 18a of the first brake system section 10a includes an exclusive OR circuit (EOR circuit), which receives, as its input signals, a drive command output from the controller 3a of its own brake system and a correction signal output from the controller 3b of the other brake system. The correction unit 18b of the second brake system section 10b also includes an EOR circuit. The controller 3a of the first brake system section 10a outputs a correction signal to the correction unit 18b of the second brake system section 10b. The correction signal enables a drive command output from the correction unit 18a to the driver 17a to be optimized by performing an exclusive OR operation. Likewise, the controller 3b of the second brake system section 10b outputs a correction signal to the correction unit 18a of the first brake system section 10a. The correction signal enables a drive command output from the correction unit 18b to the driver 17b to be optimized by performing an exclusive OR operation.

A drive command is output from each of the controller 3a and 3b as an on/off signal, that is, a signal set at "1" or "0". The controller 3a of the first brake system section 10a outputs, as a correction signal, "1" to the controller 3b of the second brake system section 10b when an incorrect drive command is output from the controller 3b of the second brake system section 10b. Likewise, the controller 3b of the second brake system section 10b outputs, as a correction signal, "1" to the controller 3a of the first brake system section 10a when an incorrect drive command is output from the controller 3a of the first brake system section 10a. In the present embodiment, a signal set at "1" indicates a "rotate" command and a signal set at "0" indicates a "stop" command.

For example, when a drive command output from the controller 3b of the second brake system section 10b is "0" whereas a correct drive command for the second brake system section 10b assumed based on the outputs from the sensors 27b, 28b, and 29b of the second brake system section 10b is "1", the controller 3a of the first brake system section 10a outputs, as a correction signal, "1" to the correction unit 18b of the second brake system section 10b. This causes the drive command output from the correction unit 18b of the second brake system section 10b to the driver 17b to be optimized to "1" by an exclusive OR operation using "1" and "0". The controller 3b of the second brake system section 10b operates in the same manner as the controller 3a of the first brake system section 10a.

When a drive command output from the controller 3b of the second brake system section 10b is "1" whereas a correct drive command assumed for the second brake system section 10b is "0", the controller 3a of the first brake system section 10a outputs, as a correction signal, "1" to the correction unit 18b of the second brake system section 10b. This causes the drive command output from the correction unit 18b of the second brake system section 10b to the driver 17b to be optimized to "0" by an exclusive OR operation using "1" and "1". The controller 3b of the second brake system section 10b operates in the same manner as the controller 3a of the first brake system section 10a.

The following describes the control of the electric parking brake system with the above-described structure. Because the first brake system section 10a and the second brake system section 10b have the same structure and the controllers 3a and 3b execute the same processing, the following only describes the processing executed by the controller 3a of the first brake system section 10a. The processing executed by the controller 3b of the second brake system section 10b will not be described.

Figure 3:
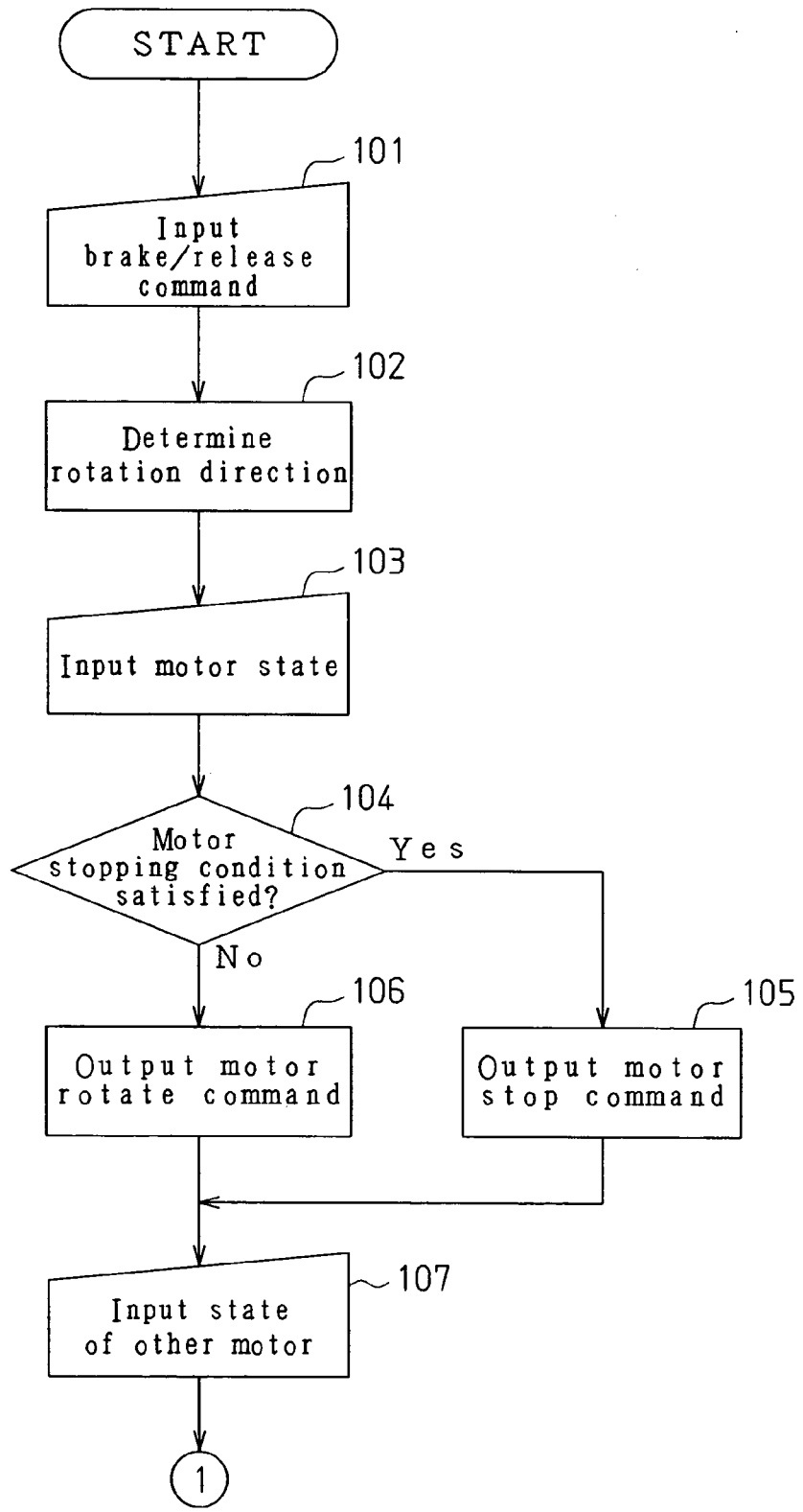
FIG. 3 is a flowchart showing the control of the electric parking brake system of FIG. 1.
Figure 4:
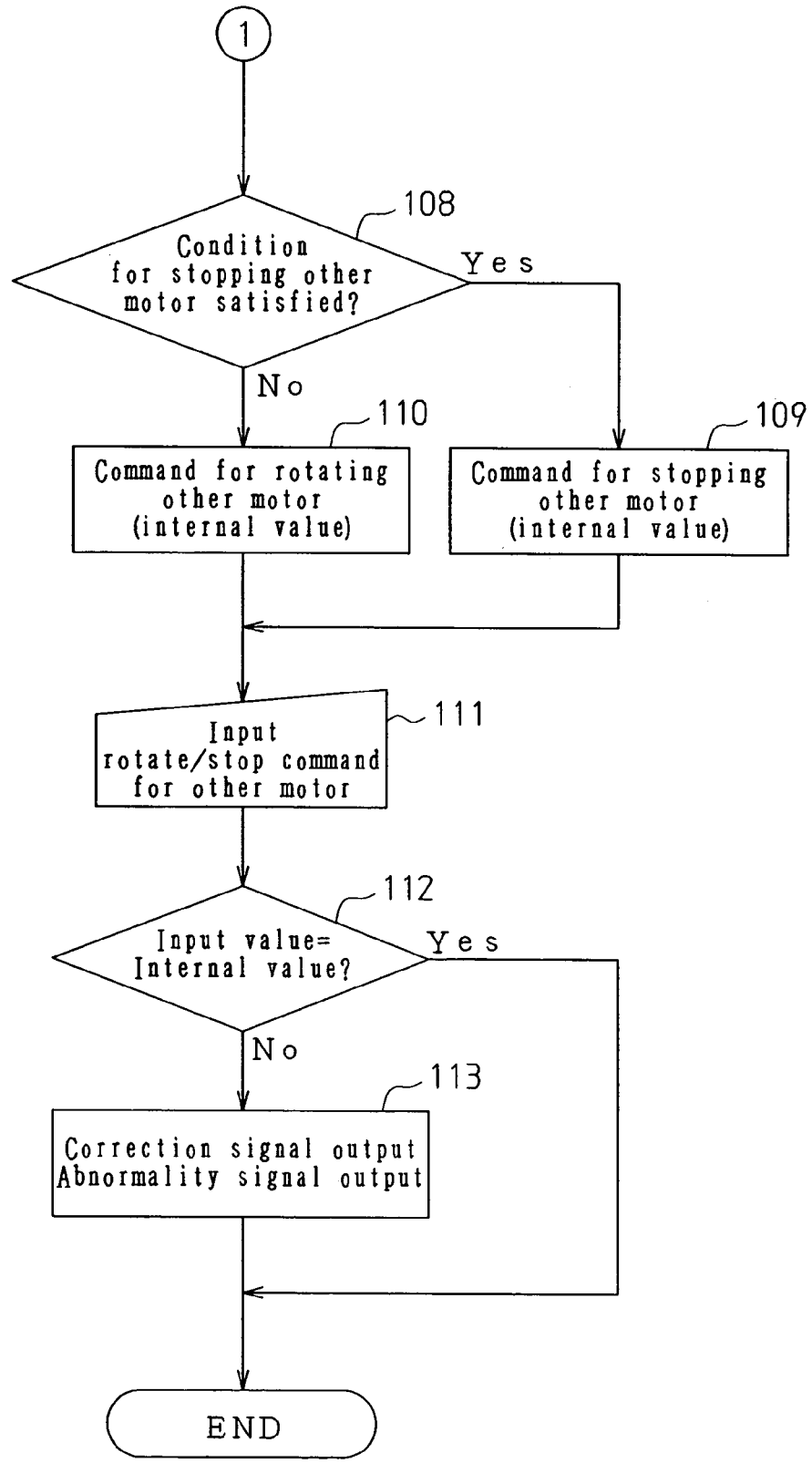
FIG. 4 is a flowchart showing the control of the electric parking brake system of FIG. 1.

FIGS. 3 and 4 are flowcharts showing the control of the electric parking brake system. As shown in FIG. 3, the controller 3a receives a brake command signal from the host ECU 11 (step S101). The controller 3a determines the rotation direction of the motor 22a to execute an applying operation or a releasing operation of the electric parking brake 2a based on the input brake command signal (step S102).

Then, the controller 3a detects the operation state of the electric parking brake 2a based on inputs from the rotation speed sensors 27a and 28a and the current sensor 29a included in the first brake system section 10a (step S103). Based on the detection result, the controller 3a determines whether a condition for stopping the motor 22a is satisfied, that is, whether the applying operation or the releasing operation of the electric parking brake 2a in its own brake system is to be terminated, and determines the drive command that is to be output to the driver 17a (step S104).

When the determination result in step S104 is "YES", that is, when determining that the condition for stopping the motor 22a is satisfied, the controller 3a outputs a stop command to the driver 17a (step S105). When the determination result in step S104 is "NO", that is, when determining that the condition for stopping the motor 22a is not satisfied, the controller 3a outputs a rotate command to the driver 17a (step S106).

Then, the controller 3a detects the operation state of the electric parking brake 2b of the second brake system section 10b, based on inputs from the rotation speed sensors 27b and 28b and the current sensor 29b included in the second brake system section 10b (step S107). Based on the detection result, the controller 3a determines whether a condition for stopping the motor 22b in the second brake system section 10b is satisfied, that is, whether the applying operation or the releasing operation of the electric parking brake 2b in the other brake system is to be terminated (step S108).

When the determination result in step S108 is "YES", that is, when determining that the condition for stopping the motor 22b in the other brake system is satisfied, the controller 3a assumes the drive command (internal value) that should be output from the controller 3b of the other brake system to be a stop command (step S109). When the determination result in step S108 is "NO", that is, when determining that the condition for stopping the motor 22b in the other brake system is not satisfied, the controller 3a assumes the drive command (internal value) to be a rotate command (step S110).

The controller 3a receives an input of a drive command (input value) that is output from the controller 3b of the other brake system (step S111) and determines whether the input value and the internal value assumed in step S109 or S110 match (step S112).

When the determination result in step S112 is "NO", that is, when determining that the input value and the internal value do not match, in other words, when the drive command output from the controller 3b of the other brake system is incorrect, the controller 3a determines that an abnormality has occurred in the other brake system. The controller 3a outputs an abnormality detection signal to the host ECU 11 and outputs a correction signal to the correction unit 18b of the other brake system to optimize the drive command in the other brake system (step S113).

When the determination result in step S112 is "YES", that is, when determining that the input value and the internal value match, the controller 3a does not execute the processing in step S113.

The present embodiment has the following advantages.

(1) Each of the controllers 3a and 3b included in the electric parking brake system 1 detects the operation state of the electric parking brake 2a or 2b of the other brake system based on the inputs from the sensors of the other brake system. Based on the detected operation state of the electric parking brake 2a or 2b of the other brake system, each of the controller 3a and 3b assumes the drive command that should be output from the controller 3a or 3b of the other brake system. Also, each of the controllers 3a and 3b receives an input of a drive command that is output from the controller 3a or 3b of the other brake system. Each of the controllers 3a and 3b compares the assumed drive command (internal value) with the input drive command (input value). When the input value and the internal value do not match, each of the controllers 3a and 3b determines that an abnormality has occurred in the other brake system.

In other words, the controllers 3a and 3b mutually monitor the state of the other brake system. Each of the controllers 3a and 3b can detect a failure occurring in the other brake system at an early stage so that the failure may quickly be cooed with. This ensures high braking stability.

The electric parking brake system 1 does not use a voter employing a majority voting method referred to in the description of the prior art. Thus, the electric parking brake system 1 functions effectively even with two brake systems (or more than two brake systems) and can be realized by a simplified structure.

(2) The brake systems 10a and 10b respectively include the correction units 18a and 18b to optimize an incorrect drive command. Each of the controller 3a and 3b outputs a correction signal to the correction unit 18a or 18b of the other brake system when an incorrect drive command is output from the controller 3a or 3b of the other brake system.

In such a structure, the controllers 3a and 3b mutually optimize an incorrect drive command that is output when a failure occurs in the other brake system. This ensures reliable braking even in a brake system in which an abnormality has occurred and ensures highly braking stability.

(3) A drive command is output from each of the controllers 3a and 3b as an on/off signal, that is, as a signal set at "1" or "0". Each of the correction units 18a and 18b includes an exclusive OR (EOR) circuit that receives, as its input signals, a drive command output from the controller 3a or 3b of its own brake system, and a correction signal output from the controller 3a or 3b of the other brake system. Each of the controllers 3a and 3b outputs, as a correction signal, "1" to the controller 3a or 3b of the other brake system when receiving an input of an incorrect drive command from the controller 3a or 3b of the other brake system.

In such a structure, a drive command output from the correction unit 18a or 18b is optimized by performing an exclusive OR operation on an incorrect drive command and a correction signal. This ensures high braking stability with a simplified structure.

(4) The host ECU 11 included in the electric parking brake system 1 outputs a brake apply signal or a brake release signal to each of the controller 3a of the first brake system section 10a and the controller 3b of the second brake system section 10b in parallel to control the performance of parking braking of a vehicle. Each of the controllers 3a and 3b outputs an abnormality detection signal to the host ECU 11 when detecting an abnormality in the other brake system.

When an abnormality occurs in the brake system section 10a or 10b, that is, a failure occurs in a part of the brake system section 10a or 10b, such a failure may quickly be coped with. This prevents damage caused by the failure from being expanded, and ensures high reliability.

(5) The host ECU 11 communicates with the controller 3a or 3b included in the brake system in which an abnormality has been detected based on an abnormality detection signal. When no response is made to the communication, the host ECU 11 determines that a failure has occurred in the controller 3a or 3b included in the abnormality-detected brake system. This enables early detection of a failure occurring in the controller 3a or 3b so that the failure may quickly be coped with and ensures high reliability.

(6) The vehicle state detection units for detecting vehicle state information are connected to the host ECU 11. The host ECU 11 determines a brake command signal based on vehicle state information detected by the vehicle state detection units. This structure enables the performance of parking braking to be suitably adjusted according to the state of the vehicle.

(7) The host ECU 11 detects vehicle state information used for the same purpose, by a plurality of methods involving one or a predetermined combination of the vehicle state detection units. This enables vehicle state information, which is used to determine a brake command signal, to have redundancy, so that the performance of parking braking can be more suitably adjusted. As a result, high reliability is ensured.

The following describes a second embodiment of the present invention, with reference to FIGS. 5 to 9 while incorporating FIG. 1. The present embodiment differs from the embodiment illustrated in FIGS. 1 to 4 in that each of the controllers 3a and 3b includes a memory 35 (see FIG. 1). The components in the present embodiment that are the same as the components in the embodiment illustrated in FIGS. 1 to 4 are given the same reference numerals as those components, and are not described here. In the present embodiment, because the first brake system section 10a and the second brake system section 10b have the same structure, the following description is focused on the structure of the first brake system section 10a.

As shown in FIG. 5, the memory 35 stores a control table 36. The control table 36 defines the correspondence between the brake command signal, the elapsed time, the signals input from the sensors 27a, 28a, and 29a, and the location where a failure has occurred (and its cause).

In the present embodiment, a case in which signals indicating that the motor 22a is rotating are input (pulse signals are input) from the first and second rotation speed sensors 27a and 28a is regarded as a case having a change, whereas a case in which such signals are not input (pulse signals are not input) from the first and second rotation speed sensors 27a and 28a is regarded as a case having no change. Hereafter, such a signal in the case having a change is referred to as a "signal with change", and such a signal in the case having no change is referred to as a "signal with no change". To be more specific, when a signal with change is input from each of the rotation speed sensors 27a and 28a, the motor 22a is in a rotating state. When a signal with no change is input from each of the rotation speed sensors 27a and 28a, the motor 22a is in a stopped state.

The controller 3a detects a failure in the first brake system section 10a and those sensors, based on the control table 36. When detecting an abnormality in one of the first brake system section 10a and the sensors, the controller 3a outputs an abnormality detection signal to the host ECU 11.

The following describes the failure detection executed by the controller 3a in detail.

Figure 7:
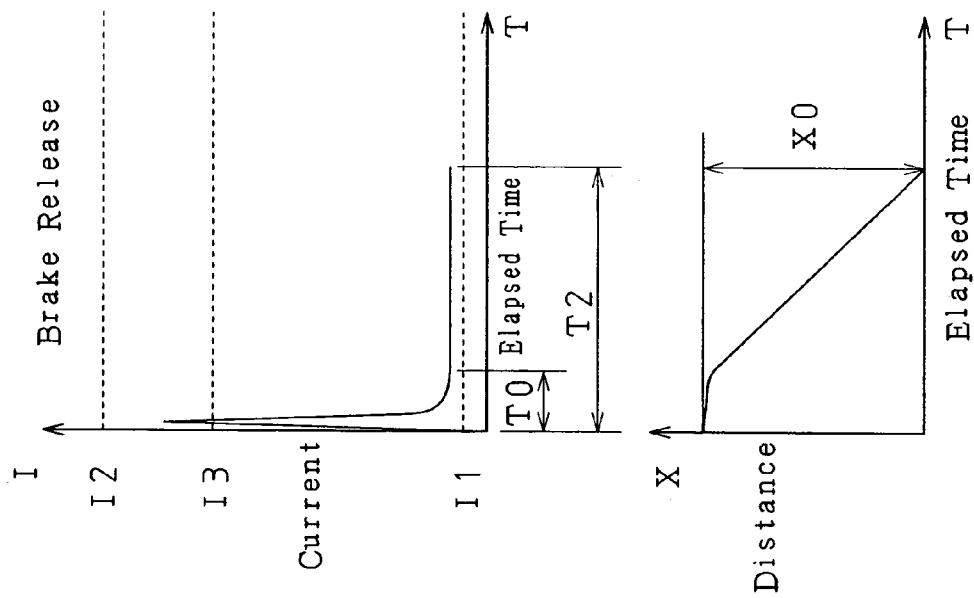
FIG. 7 is a time chart showing the relationship, in a brake-released state, between an amount of driving current supplied to a motor and a distance by which a friction member is moved.
Figure 6:
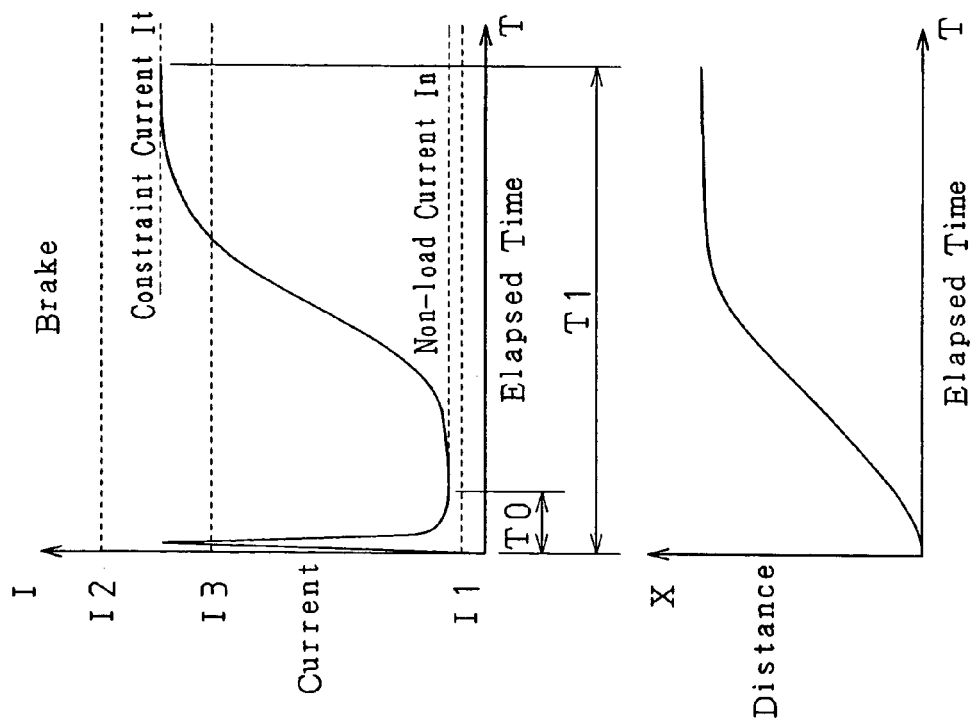
FIG. 6 is a time chart showing the relationship, in a brake-applied state, between an amount of driving current supplied to a motor and a distance by which a friction member is moved.

The following first describes the relationship between the operation state (elapsed time) of the electric parking brake 2a during normal operations, and the rotation state of the motor 22a and the amount of driving current supplied to the motor 22a, with reference to FIGS. 6 and 7 while incorporating FIG. 2.

FIG. 6 is a time chart showing the relationship, in a brake-applied state, between the amount of driving current supplied to the motor and the distance by which the friction member in the brake unit is moved. FIG. 7 is a time chart showing the relationship, in a brake-released state, between the amount of driving current supplied to the motor and the distance by which the friction member in the brake unit is moved.

As shown in FIG. 6, in the initial stage of the brake-applied state, a high load is applied to the motor 22a until the friction member 32 in the brake unit 21a (see FIG. 2) starts moving, that is, during the starting of the motor 22a. This causes the current amount I of driving current supplied to the motor 22a to rapidly increase when the motor 22a is energized. The time elapses from when the motor 22a is energized to when the motor 22a starts rotating is short enough that it may be ignored.

The motor 22a starts rotating and the friction member 32 starts moving so that the load applied to the motor 22a decreases due to an inertial force. This causes the current amount I to decrease. When the friction member 32 starts moving in such a direction to approach the rotor 31, that is, when the motor 22a starts rotating at a constant speed, the current amount I of driving current supplied to the motor 22a reaches the non-load current In, and thereafter takes a substantially fixed value.

The motor 22a is constantly supplied with a predetermined voltage. In the case where the motor 22a is repeatedly driven, the current amount I reaches the non-load current In after substantially the same time elapses from each time the motor 22a is energized. In the present embodiment, the time elapses from when the motor 22a is energized to when the current amount I reaches the non-load current In is set as the first predetermined time T0.

Then, when the friction member 32 moves further until pressing the rotor 31, the current amount I of driving current supplied to the motor 22a gradually increases as the load increases due to the pressing of the friction member 32 against the rotor 31. When the friction member 32 is moved until it cannot be moved any further, that is, when the rotation of the motor 22a is locked, the current amount I of driving current supplied to the motor 22a reaches the constraint current It, and thereafter takes a substantially fixed value.

The motor 22a is constantly supplied with a predetermined voltage. As in the case of the first predetermined time T0, when the motor 22a is repeatedly driven, the electric current I reaches the constraint current It after substantially the same time elapses from every time when the motor 22a is energized. This also means that every time when the motor 22a is driven, the brake applying operation is terminated after substantially the same time. In the present embodiment, the time elapsed from when the motor 22a is energized to when the current amount I reaches the constraint current It, that is, to when the brake applying operation is terminated, is set as the second predetermined time T1.

As shown in FIG. 7, in the initial stage of the brake-released state as in the brake-applied state, the current amount I of driving current supplied to the motor 22a increases rapidly when the motor 22a is energized. After this, the current amount I starts decreasing when the motor 22a starts rotating. When the friction member 32 starts moving in such a direction to be spaced from the rotor 31, that is, when the motor 22a starts rotating at the constant speed, the current amount I of driving current supplied to the motor 22a reaches the non-load current In in the first predetermined time T0, and thereafter takes a substantially fixed value.

In the present embodiment, the brake releasing operation is terminated when the distance X by which the friction member 32 is moved reaches the predetermined distance X0. After the first predetermined time T0 elapses, the motor 22a is in a low-load state. In this state, almost all torque produced by the rotation of the motor 22a is used for the movement of the friction member 32. This means that the distance X by which the friction member 32 is moved is proportional to the rotation number of the motor 22a and the time T (elapsed time) elapses from when the motor 22a is energized. In the present embodiment, the time elapses from when the motor 22a is energized to when the friction member 32 is moved by the predetermined distance X0, which causes the brake releasing operation to be terminated, is set as the third predetermined time T2.

The following describes the correspondence defined in the control table 36 for the elapsed time, the signals input from the sensors 27a, 28a, and 29a, and the location where the failure has occurred in detail.

As shown in FIG. 5, in the present embodiment, the control table 3 defines the correspondence between the predetermined times T0, T1, and T2, the first predetermined current I1 set based on the non-load current In, the second and third predetermined currents I2 and I3 set based on the constraint current It, and the signals with or with no change input from the first and second rotation speed sensors 27a and 28a, and the location where the failure has occurred.

The first and third predetermined currents I1 and I3 are set at 80% of their logical values, by taking error into consideration. The second predetermined current I2 is set at about 120% of its logical value. The first to third predetermined times T0, T1, and T2 are also set at about 120% of their logical values.

[Wiring Breakage in Power Supply Path]

As shown in FIGS. 6 and 7, in an energized state, a value of the current amount I of driving current supplied to the motor 22a is smaller than the non-load current In only during the startup of the motor 22a. This continues only for a time that is short enough that it can be ignored. In an energized state, when a value of the current amount I input from the current sensor 29a is smaller than the first predetermined current I1 and signals with no change are input from the rotation speed sensors 27a and 28a irrespective of the elapsed time, it is assumed that a wiring breakage has occurred in the motor 22a or the power supply path to the motor 22.

[Short Circuit in Power Supply Path]

The current amount I of driving current supplied to the motor 22a reaches the maximum constraint current It when the motor 22a is in a locked state. In an energized state, when a value of the current amount I input from the current sensor 29a is larger than the second predetermined current I2 irrespective of the elapsed time and of the brake-applied state or the brake-released state, it is assumed that a short circuit has occurred in the motor 22a or its power supply path. The "brake-applied state" is where a brake apply signal is input as a brake command signal, whereas the "brake-released state" is where a brake release signal is input as a brake command signal.

[Failure in Current Sensor]

At the initial stage of the brake-applied state or the brake-released state, that is, within the first predetermined time T0, a value of the current amount I of driving current supplied to the motor 22a is smaller than the non-load current In only during the startup of the motor 22a. In an energized state, when a value of the current amount I input from the current sensor 29a is smaller than the first predetermined current I1 and signals with change are input from the rotation speed sensors 27a and 28a within the first predetermined time T0, it is assumed that a failure has occurred in the current sensor 29a.

[Failure in Rotation Speed sensor]

When a value of the current amount I of driving current supplied to the motor 22a is larger than the non-load current In within the first predetermined time T0, the motor 22a is in a rotating state. In an energized state, when a value of the current amount I input from the current sensor 29a is smaller than the first predetermined current I1 and a signal with no change is input from either the first rotation speed sensor 27a or the second rotation speed sensor 28a within the first predetermined time T0, it is assumed that a failure has occurred in the rotation speed sensor that has output the signal with no change.

[Failure in Actuator (Locked)]

Within the first predetermined time T0, the motor 22a is in a rotating state except during the extremely short starting time. In an energized state, when signals with no change are input from both the first rotation speed sensor 27a and the second rotation speed sensor 28a, and a value of the current amount I input from the current sensor 29a is larger than the third predetermined current I3 within the first predetermined time T0, it is assumed that a failure to lock the rotation of the motor 22a has occurred in the actuator 23a.

[Failure in Actuator (Motor Idling)]

As shown in FIG. 6, the motor 22a is in a locked state when the brake applying operation has been already terminated, that is, after the second predetermined time T1 has elapsed. By this time, the current amount I of driving current supplied to the motor 22a should have reached the constraint current It. In an energized state, when signals with change are input from both the first rotation speed sensor 27a and the second rotation speed sensor 28a and a value of the current amount I input from the current sensor 29a is smaller than the third predetermined current I3 after the second predetermined time T1 has elapsed, it is assumed that a failure has occurred in the actuator 23a and the friction member 32 is still moving. The cause for the failure is assumed as the idling of the motor 22a.

[Failure in Actuator (Defective Reversed Rotation)]

As shown in FIG. 7, the motor 22a must be stopped when the brake applying operation has been already terminated, that is, after the third predetermined time T2 has elapsed. In an energized state, when signals with change are input from both the first rotation speed sensor 27a and the second rotation speed sensor 28a after the third predetermined time T2 has elapsed, it is assumed that the distance X by which the friction member 32 is moved has not reached the predetermined distance X0, that is, a defective reversed rotation has occurred in the actuator 23a.

[Failure in Actuator (Excessive Reversed Rotation)]

In the present embodiment, the controller 3a counts the number of pulses of a pulse signal input from each rotation speed sensor, and multiplies the detected rotation number of the motor and the distance by which the friction member is moved per rotation during normal operations. In this way, the controller 3a assumes the distance X by which the friction member 32 is to be moved. Also, the time elapsed from when the motor 22a is energized to when the friction member 32 is moved by the predetermined distance X0 is set as the third predetermined time T2. The predetermined distance X0 is set as the distance to cause the brake releasing operation to be terminated. There may be a case, for example, in which signals with no change are input from the first rotation speed sensor 27a and the second rotation speed sensor 28a although it is assumed that the distance X by which the friction member 32 is moved has not reached the predetermined distance X0. In this case, it is assumed that the friction member 32 has been moved by a distance exceeding the predetermined distance X0 to such a location that it cannot be moved any further. The cause for this may be a failure that the distance by which the friction member 32 is moved per rotation of the motor 22a has increased and caused the friction member 32 to move excessively. In other words, excessive reversed rotation has occurred in the actuator 23a.

The following describes a failure detection process executed by the controller 3a.

Figure 8:
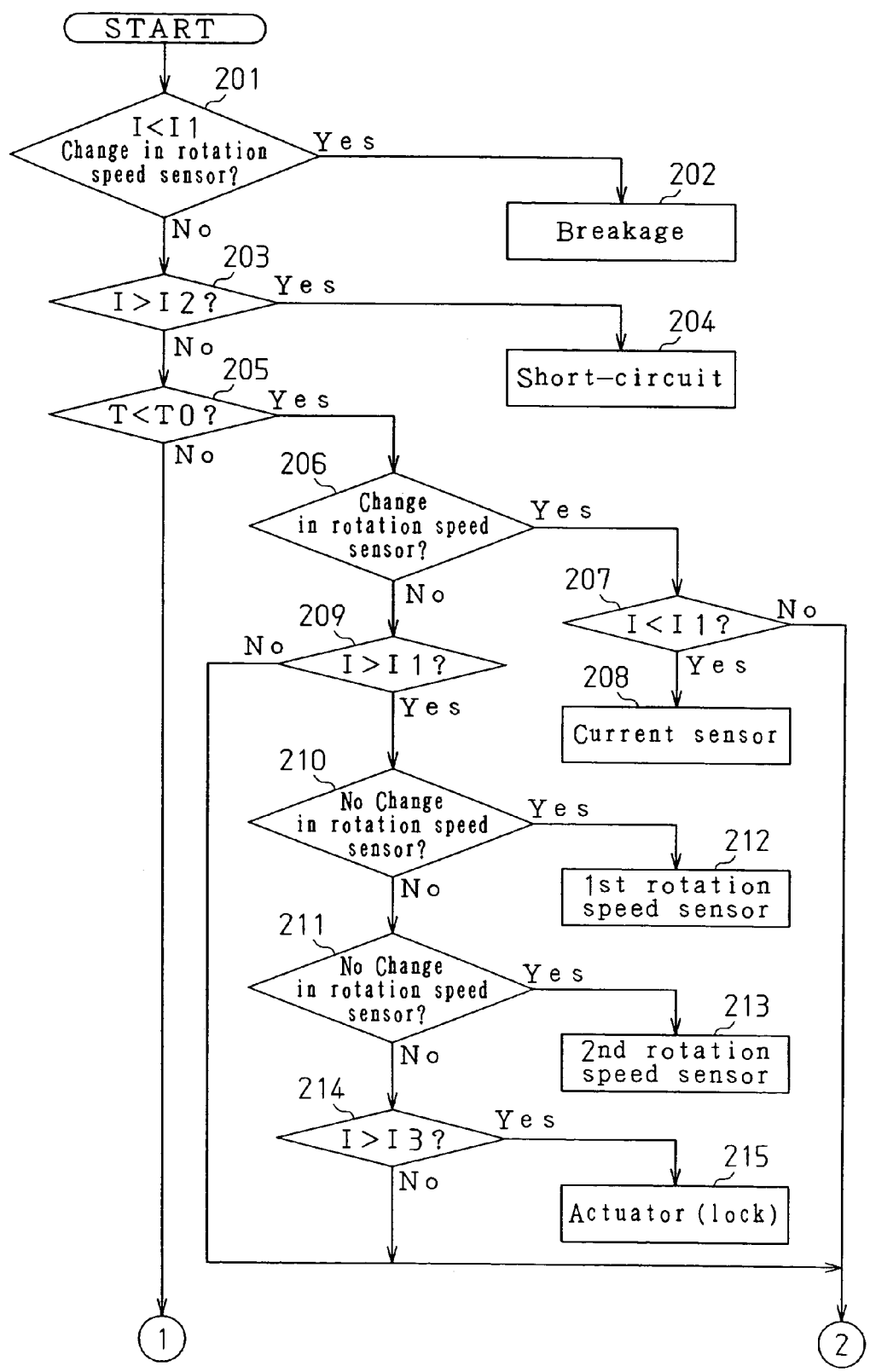
FIG. 8 is a flowchart showing a failure detection process.
Figure 9:
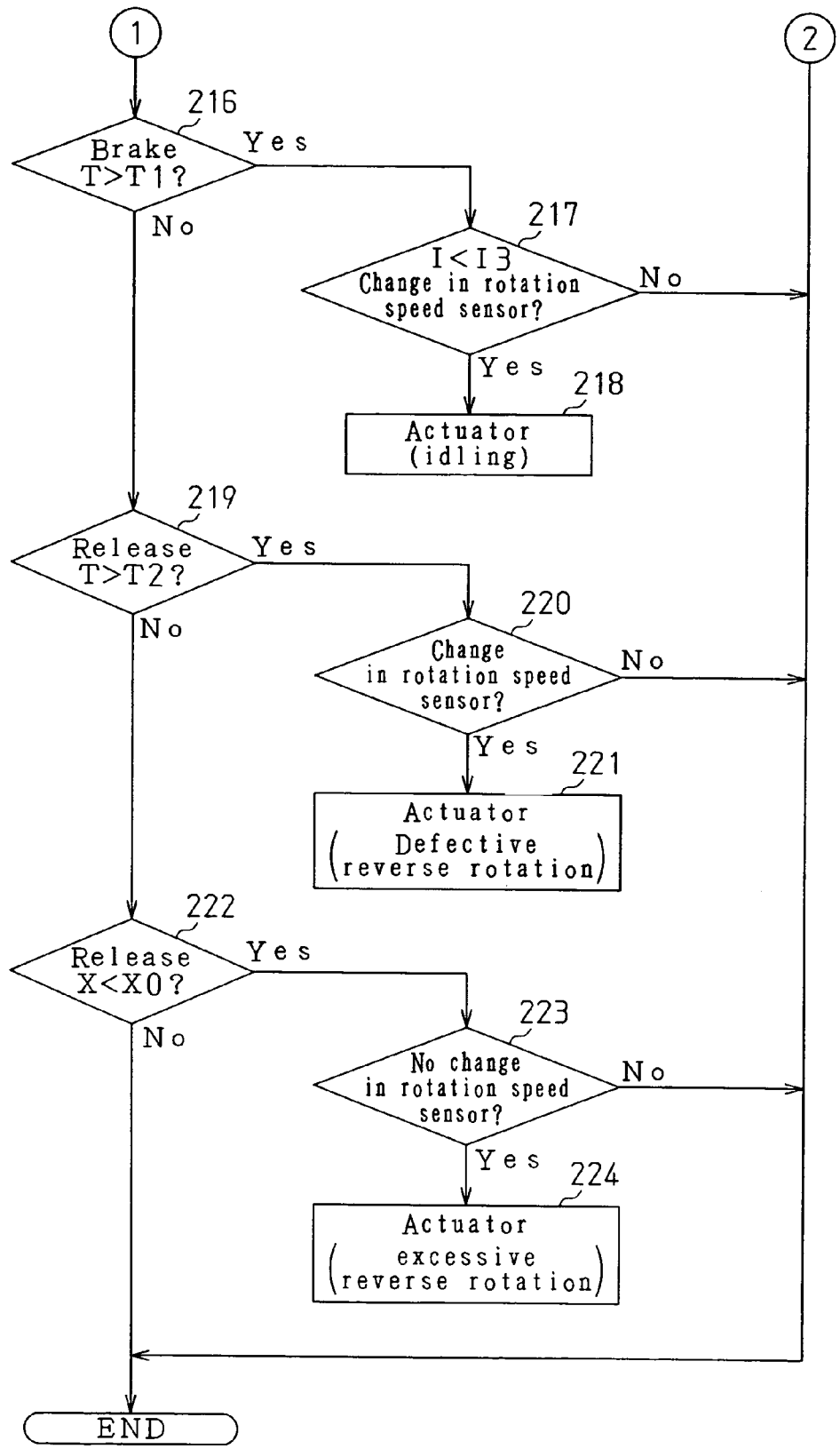
FIG. 9 is a flowchart showing the failure detection process.

FIGS. 8 and 9 are flowcharts showing the failure detection process executed by the controller 3a.

The controller 3a first determines whether a value of the current amount I of driving current supplied to the motor 22a is smaller than the first predetermined current I1 and signals with no change are input from both the first rotation speed sensor 27a and the second rotation speed sensor 28a (step S201). When the determination result in step S201 is "YES", that is, when a value of the current amount I is smaller than the first predetermined current I1 and signals with no change are input from both the first and second rotation speed sensors 27a and 28a, the controller 3a determines that a wiring breakage has occurred in the motor 22a or the power supply path to the motor 22a (step S202).

When the determination result in step S201 is "NO", that is, when a value of the current amount I is smaller than the first predetermined current I1 and signals with change are input from both the first and second rotation speed sensors 27a and 28a, the controller 3a further determines whether the current amount I is larger than the second predetermined current I2 in step S203. When the determination result in step S203 is "YES", that is, when the current amount I is larger than the second predetermined current I2, the controller 3a determines that a short circuit has occurred in the motor 22a or the power supply path to the motor 22a (step S204).

When the determination result in step S203 is "NO", that is, when a value of the current amount I is smaller than the second predetermined value I2, the controller 3a determines whether the elapsed time T is smaller than the first predetermined time T0 (step S205).

When the determination result in step S205 is "YES", that is, when the elapsed time T is smaller than the first predetermined time T0, the controller 3a determines whether signals with change are input from both the first rotation speed sensor 27a and the second rotation speed sensor 28a (step S206).

When the determination result in step S206 is "YES", that is, when signals with change are input from both the first and second rotation speed sensors 27a and 28a, the controller 3a determines whether the current amount I is smaller than the first predetermined current I1 (step S207). When the determination result in step S207 is "YES", that is, when the current amount I is smaller than the first predetermined current I1, in other words, signals with change are input from the rotation speed sensors 27a and 28a and the current amount I is smaller than the first predetermined current I1 before the first predetermined time T0 elapses, the controller 3a determines that a failure has occurred in the current sensor 29a (step S208). When the determination result in step S207 is "NO", that is, when the current amount I is larger than the first predetermined current I1, the controller 3a does not execute step S208 and the subsequent steps.

When the determination result in step S206 is "NO", that is, signals with no change are input from both the first and second rotation speed sensors 27a and 28a, the controller 3a determines whether the current amount I is larger than the first predetermined current I1 (step S209). When the determination result in step S209 is "YES", that is, when the current amount I is larger than the first predetermined current I1, the controller 3a determines whether a signal with no change is input from either the first rotation speed sensor 27a or the second rotation speed sensor 28a (steps S210 and 211).

When the determination result in step S210 is "YES", that is, when a signal with no change is input from the first rotation speed sensor 27a, the controller 3a determines that a failure has occurred in the first rotation speed sensor 27a (step S212). Likewise, when the determination result in step S211 is "YES", that is, when a signal with no change is input from the second rotation speed sensor 28a, the controller 3a determines that a failure has occurred in the second rotation speed sensor 28a (step S213). When the determination result in step S209 is "NO", that is, when the current amount I is smaller than the first predetermined current I1, the controller 3a does not execute the processing in step 210 and the subsequent steps.

Then, when the determination results in steps S210 and 211 are "NO", that is, when a signal with no change is not input from each of the first rotation speed sensor 27a and the second rotation speed sensor 28a, in other words, signals with no change are input from both the rotation speed sensors 27a and 28a, the controller 3a determines whether the current amount I is larger than the third predetermined current I3 (step S214). When the determination result in step S214 is "YES", that is, when the current amount I is larger than the third predetermined current I3, in other words, signals with no change are input from both the rotation speed sensors 27a and 28a and the current amount I is larger than the third predetermined current I3 before the first predetermined time T0 elapses, the controller 3a determines that the actuator 23a has been locked (step S215). When the determination result in step S214 is "NO", that is, when the current amount I is smaller than the third predetermined current I3, the controller 3a does not execute step 215 and the subsequent steps.

When the determination result in step S205 is "NO", that is, when the first predetermined time T0 has elapsed, the controller 3a determines whether the electric parking brake 2a is in the brake-applied state (where a brake apply signal is input) and the second predetermined time T1 has elapsed (step S216).

When the determination result in step S216 is "YES", that is, when the electric parking brake 2a is in the brake-applied state and the second predetermined time T1 has elapsed, the controller 3a determines whether the current amount I is smaller than the third predetermined current I3 and signals with change are input from both the first rotation speed sensor 27a and the second rotation speed sensor 28a (step S217).

When the determination result in step S217 is "YES", that is, when the current amount I is smaller than the third predetermined current I3 and signals with change are input from both the first and second rotation speed sensors 27a and 28a, the controller 3a determines that a failure that causes idling of the motor 22a has occurred in the actuator 23a (step S218). When the determination result in step S217 is "NO", that is, when the current amount I is smaller than the third predetermined current I3 and signals with no change are input from both the first and second rotation speed sensors 27a and 28a, the controller 3a does not execute the processing in step 218 and the subsequent steps.

When the determination result in step S216 is "NO", that is, when the electric parking brake 2a is in the brake applied state and the second predetermined time T1 has not elapsed, the controller 3a determines whether the electric parking brake 2a is in the brake-released state (where a brake release signal is input) and the third predetermined time T2 has elapsed (step S219).

When the determination result in step S219 is "YES", that is, when the electric parking brake 2a is in the brake-released state and the third predetermined time T2 as elapsed, the controller 3a determines whether signals with change are input from both the first rotation speed sensor 27a and the second rotation speed sensor 28a (step S220). When the determination result in step S220 is "YES", that is, when signals with change are input from both the first and second rotation speed sensors 27a and 28a, the controller 3a determines that defective reversed rotation has occurred in the actuator 23a (step S221). When the determination result in step S220 is "NO", that is, when signals with no change are input from both the first and second rotation speed sensors 27a and 28a, the controller 3a does not execute the processing in step 221 and the subsequent steps.

When the determination result in step S219 is "NO", that is, when the electric parking brake 2a is in the brake-released state and the third predetermined time T2 has not elapsed, the controller 3a determines whether the distance X by which the friction member 32 in the brake unit 21a is moved is assumed to have reached the predetermined distance X0 in the brake-released state (step S222).

When the determination result in step S222 is "YES", that is, when the distance X by which the friction member 32 in the brake unit 21a is moved is assumed to have not reached the predetermined distance X0 in the brake-released state, the controller 3a determines whether signals with no change are input from both the first rotation speed sensor 27a and the second rotation speed sensor 28a (step S223). When the determination result in step S223 is "YES", that is, when signals with no change are input from both the first rotation speed sensor 27a and the second rotation speed sensor 28a, the controller 3a determines that excessive reversed rotation has occurred in the actuator 23a (step S224).

The present embodiment has the following advantages.

(1) The controller 3a detects a failure occurring in at least one of the electric parking brake 2a, the power supply path to the motor 22a, the first rotation speed sensor 27a, the second rotation speed sensor 28a, and the current sensor 29a, based on one of the brake command signal, the rotation state, the current amount, and the elapsed time.

This structure enables early detection of a failure occurring in at least one of the electric parking brake 2a, the power supply path to the motor 22a, the first rotation speed sensor 27a, the second rotation speed sensor 28a, and the current sensor 29a.

(2) The controller 3a determines that a wiring breakage has occurred in the motor 22a or the power supply path to the motor 22a when a value of the current amount I is smaller than the first predetermined current I1, which is set based on the non-load current In, and signals with no change are input from both the rotation speed sensors 27a and 28a. This structure enables early detection of a wiring breakage occurring in the motor 22a or the power supply path to the motor 22a.

(3) The controller 3a determines that a short circuit has occurred in the motor 22a or the power supply path to the motor 22a when a value of the current amount I is larger than the second predetermined current I2, which is set based on the constraint current It. This structure enables early detection of a short circuit occurring in the motor 22a or the power supply path to the motor 22a.

(4) The controller 3a determines that a failure has occurred in the current sensor 29a when a value of the current amount I is smaller than the first predetermined current I1 and signals with change are input from both the rotation speed sensors 27a and 28a within the first predetermined time T0, which is set based on the time elapses from when the motor 22a is energized to when the current amount I reaches the non-load current In. This structure enables early detection of a failure occurring in the current sensor 29a.

(5) The controller 3a determines that a failure that causes the motor 22a to be locked has occurred in the electric parking brake 2a (actuator 23a), that is, that the actuator 23a is locked, when signals with no change are input from both the rotation speed sensors 27a and 28a and a value of the current amount I is larger than the third predetermined current I3 set based the constraint current It within the first predetermined time T0. This structure enables early detection of a failure occurring in the electric parking brake 2a. Further, the cause for such a failure is identified as being the locked state of the actuator 23a. This enables correct and quick repair of the failure.

(6) The controller 3a determines that a failure that causes idling of the motor 22a has occurred in the electric parking brake 2a (actuator 23a), when signals with change are input from both the rotation speed sensors 27a and 28a and a value of the current amount I is smaller than the third predetermined current I3, in the brake-applied state and after the second predetermined time T1 set based on the time at which the brake applying operation is terminated has elapsed. This structure enables early detection of a failure occurring in the electric parking brake 2a. Further, the cause for such a failure is identified as being the idling of the motor 22a. This enables the failure to be appropriately coped with quickly.

(7) The controller 3a determines that defective reversed rotation has occurred in the electric parking brake 2a (actuator 23a), when signals with change are input from both the rotation speed sensors 27a and 28a, in the brake releasing operation and after the third predetermined time T2 set based on the time at which the brake releasing operation is terminated has elapsed. This structure enables early detection of a failure occurring in the electric parking brake 2a. Further, the cause for such a failure can be identified as being the defective reversed rotation. This enables the failure to be appropriately coped with quickly.

(8) The electric parking brake 2a includes the rotor 31 that is integrally rotated with a wheel, and the pair of friction members 32 that is moved to approach or be spaced from the rotor 31 in accordance with forward/reversed rotation of the motor 22a. The controller 3a counts the number of pulses of a signal input from each of the rotation speed sensors 27a and 28a, and multiplies the detected rotation number of the motor and the distance by which the friction member 32 is moved per rotation during normal operations. In this way, the controller 3a assumes the distance X by which the friction member 32 is to be moved.

The controller 3a determines that the friction member 32 has been moved by a distance exceeding the predetermined distance X0 to such a location that it cannot be moved any further, when signals with no change are input from the rotation speed sensors 27a and 28a in the brake-released state although it is assumed that the distance X has not reached the predetermined distance X0. The predetermined distance X0 is set as the distance to cause the brake releasing operation to be terminated. The controller 3a further determines the cause for this as a failure that the distance by which the friction member 32 is moved per rotation of the motor 22a has increased and caused the friction member 32 to move excessively. In other words, excessive reversed rotation has occurred in the electric parking brake 2a (actuator 23a).

This structure enables early detection of a failure occurring in the electric parking brake 2a. Further, the cause for such a failure is identified as being the excessive reversed rotation. This enables the failure to be appropriately coped with quickly.

(9) The controller 3a determines that a failure has occurred in the rotation speed sensor that has output a signal with no change, when a value of the current amount I is larger than the first predetermined current I1 and a signal with no change is output from either the first rotation speed sensor 27a or the second rotation speed sensor 28a within the first predetermined time T0. This structure enables early detection of a failure occurring in either the first rotation speed sensor 27a or the second rotation speed sensor 28a. Further, the rotation speed sensor in which a failure has occurred can be identified. This enables the failure to be appropriately coped with quickly.

(10) The controller 3a outputs an abnormality detection signal to the host ECU 11 when detecting a failure. This enables early repair of such a failure and prevents damage caused by the failure from being expanded.

The above embodiments may be modified in the following forms.

In the embodiments illustrated in FIGS. 1 to 9, the electric parking brake system 1 may include three or more brake systems either in an odd number or an even number.

In the embodiments illustrated in FIGS. 1 to 9, the host ECU 11 may output detected vehicle state information to the controllers 3a and 3b of the brake systems 10a and 10b, and the controllers 3a and 3b may determine whether to execute the brake applying operation or the brake releasing operation of the electric parking brakes 2a and 2b.

In the embodiments illustrated in FIGS. 1 to 9, the electric parking brake system 1 may not include the host ECU 11, and the vehicle state detection units may be connected to the controllers 3a and 3b. In this case, the controllers 3a and 3b determine whether to execute the brake applying operation or the brake releasing operation of the electric parking brakes 2a and 2b.

In the embodiments illustrated in FIGS. 1 to 9, the electric parking brakes 2a and 2b may be disk brakes or drum brakes.

In the embodiments illustrated in FIGS. 1 to 9, each of the brake units 21a and 21b may be integrally formed with the corresponding actuator 23a or 23b. Alternatively, each of the brake units 21a and 21b may be arranged at a location separate from where the corresponding actuator 23a or 23b is arranged.

In the embodiments illustrated in FIGS. 1 to 9, each of the drivers 17a and 17b may be incorporated in the corresponding electric parking brake 2a or 2b.

In the embodiments illustrated in FIGS. 1 to 9, each of the controllers 3a and 3b may indirectly detect a drive command output from the controller 3a or 3b of the other brake system, and may compare the assumed drive command with the detected drive command.

In the embodiments illustrated in FIGS. 1 to 9, each of the correction units 18a and 18b may have the function of communicating with the controller 3a or 3b of its own brake system. Each of the controllers 3a and 3b may output, as a correction signal, a drive command (internal value) that should be output from the controller 3a or 3b of the other brake system. Then, each of the correction units 18a and 18b may output the correction signal input from the other brake system, that is, the first and second brake system section 10a or 10b, when no response is made to the communication with the controller 3a or 3b of its own brake system.

One rotation speed sensor may be provided for one motor, or three or more rotation speed sensors may be provided for one motor.

The present examples and embodiments are to be considered as illustrative and not restrictive, and the invention is not to be limited to the details given herein, but may be modified within the scope and equivalence of the appended claims.

What is claimed is:

1. A parking brake system for applying braking force to wheels of a vehicle, the parking brake system including at least two independent brake system sections, each associated with one of the wheels, each of the brake system sections comprising:
a motor;
a parking brake, driven by the motor, for applying braking force to the associated wheel;
a detector for detecting an operation state of the parking brake; and
a controller for determining a drive command that is to be output to the motor in accordance with the operation state detected by the detector, the controller detecting the operation state of the parking brake in the other brake system section through the detector of the other brake system section, assuming the drive command that is to be output from the controller of the other brake system section, detecting the drive command actually output from the controller of the other brake system section, and comparing the actually detected drive command with the assumed drive command to determine abnormality of the other brake system section, wherein the controller determines that the other brake system section is abnormal when the detected drive command does not match the assumed drive command.

2. The parking brake system according to claim 1, wherein each brake system section includes a correction unit for correcting an inappropriate drive command, the controller of each brake system section sending a correction signal to the correction unit of the other brake system section when the detected drive command does not match the assumed drive command.

3. The parking brake system according to claim 1, further comprising a host control unit for sending a brake command signal to each controller, the brake command signals being output in parallel, wherein each controller sends an abnormality detection signal to the host control unit when the detected drive command does not match the assumed drive command.

4. The parking brake system according to claim 3, wherein the host control unit determines that one of the controllers is abnormal when the abnormality detection signal indicating that said controller is abnormal is received and there is no response from said controller.

5. The paring brake system according to claim 3, further comprising:
a vehicle state detector for detecting the state of the vehicle, wherein the host control unit determines the brake command signal that is to be sent to each controller based on the detected vehicle state.

6. The parking brake system according to claim 5, wherein the vehicle state detector is one of a plurality of vehicle state detectors, each detecting different conditions of the vehicle, and the host control unit uses one or a combination of two or more vehicle conditions selected from the detected vehicle conditions to determine the brake command signal.

7. The parking brake system according to claim 1, further including a host control unit for sending a brake command signal to each controller, each brake system section further comprising:
a rotation sensor for detecting a rotation state of the motor;
a current sensor for detecting the amount of current supplied to the motor; and
an electric path through which current supplied to the motor flows, each controller detecting abnormality of at least one of the parking brake, the electric path, the rotation sensor, and the current sensor of the braking system section to which the controller belongs based on at least one of the brake command signal, the detected rotation state, the detected current amount, and the elapsed time from when the motor is activated.

8. The parking brake system according to claim 7, wherein each controller determines that there is a wire breakage in the motor or the electric path when the detected current amount is less than a predetermined first current threshold value and the signal received from the rotation sensor does not change, the first current threshold value being determined using the amount of current supplied to the motor when the motor is operated at a constant rotation speed as a criterion.

9. The parking brake system according to claim 7, wherein each controller determines that there is a short circuit in the motor or the electric path when the detected current amount is greater than a predetermined second threshold current value, the second threshold value being determined using the amount of current supplied to the motor when the motor is operated in a state in which rotation is constrained.

10. The parking brake system according to claim 7, wherein each controller determines that the current sensor is abnormal when the elapsed time is less than a predetermined first time threshold value, the detected current amount is less that a predetermined first current threshold value, and the signal received from the rotation sensor changes, the first time threshold value being determined using the time from when the motor is activated to when the motor reaches a constant rotation speed as a criterion, the first current threshold value being determined using the amount of current supplied to the motor when the motor is operated at a constant rotation speed as a criterion.

11. The parking brake system according to claim 7, wherein each controller determines that there is an abnormality causing the motor to be operated in a state in which rotation is constrained when the elapsed time is less than a predetermined first time threshold value, the detected current value is greater than a predetermined third current threshold value, and the signal received from the rotation sensor does not change, the first time threshold value being determined using the time from when the motor is activated to when the motor reaches a constant rotation speed as a criterion, and the third current threshold value being determined using the amount of current supplied to the motor when the motor is operated in a state in which rotation is constrained.

12. The parking brake system according to claim 7, wherein each controller determines that the motor is idling when the elapsed time is less than a predetermined second time threshold value, the detected current value is less than a predetermined third threshold value, and the signal received from the rotation sensor changes, the second time threshold value being determined using the time from when the motor is activated to when braking is completed as a criterion, and the third current threshold value being determined using the amount of current supplied to the motor when the motor is operated in a state in which rotation is constrained.

13. The parking brake system according to claim 7, wherein each controller determines that a reverse rotation abnormality has occurred in the parking brake when the elapsed time is less than a predetermined third time threshold value and the signal received from the rotation sensor changes, and the third time threshold value being determined using the time from when the motor is activated to when the braking is released.

14. The parking brake system according to claim 7, wherein each parking brake includes a rotor, integrally rotated with the associated wheel, and a friction member, moved toward or away from the rotor by operating the motor in a forward direction or a reverse direction, wherein each controller assumes a movement distance of the friction member based an a rotation amount of the motor and determines that excessive reverse rotation has occurred in the parking brake when receiving a brake release signal from the host control unit, the assumed movement distance has not reached a predetermined value tat is the distance in which the brake release should be completed, and the signal received from the rotation sensor does not change.

15. The parking brake system according to claim 7, wherein each controller determines that the rotation sensor that does not output a signal that changes is abnormal when the elapsed time is less that a predetermined first time threshold value, the detected current amount is greater than a predetermined first current threshold value, and the signal received from the rotation sensor does not change, the first current threshold value being determined using the amount of current supplied to the motor when the motor is operated at a constant rotation speed as a criterion.

16. The parking brake system according to claim 7, wherein each controller sends an abnormality detection signal to the host control unit when detecting the abnormality.

17. A parking brake system for applying braking force to wheels of a vehicle, the parking brake system including at least two independent brake system sections, each associated with one of the wheels, each of the brake system sections comprising:

a motor;

a parking brake, driven by the motor, for applying braking force to the associated wheel;

a detector for detecting an operation state of the parking brake;

a controller for determining a drive command that is to be output to the motor in accordance with the operation state detected by the detector, the controller detecting the operation state of the parking brake in the other brake system section through the detector of the other brake system section, assuming the drive command that is to be output from the controller of the other brake system section, detecting the drive command actually output from the controller of the other brake system section, and comparing the actually detected drive command with the assumed drive command to determine abnormality of the other brake system section; and a correction unit for correcting an inappropriate drive command, the controller sending a correction signal to the correction unit of the other brake system section when the detected drive command does not match the assumed drive command, wherein the correction unit includes an exclusive OR circuit, the drive command output from the controller of the brake system section to which the correction unit belongs and the correction signal output from the controller of the other brake system section being input to the exclusive OR circuit.

* * * * *